United States Patent [19]

De Fazio et al.

[11] Patent Number: 4,477,975
[45] Date of Patent: Oct. 23, 1984

[54] ADJUSTABLE REMOTE CENTER COMPLIANCE DEVICE

[75] Inventors: Thomas L. De Fazio, Watertown; Daniel E. Whitney, Arlington, both of Mass.

[73] Assignee: The Charles Stark Draper Laboratory, Cambridge, Mass.

[21] Appl. No.: 266,187

[22] Filed: May 22, 1981

[51] Int. Cl.³ .............................................. G01B 5/25
[52] U.S. Cl. .................................. 33/169 C; 33/185 R; 29/406
[58] Field of Search ............. 33/169 C, 169 R, 185 R, 33/172 D, 174 Q; 29/406, 407

[56] References Cited

U.S. PATENT DOCUMENTS 4,202,107  5/1980  Watson .............................. 33/169 C
4,283,153  8/1981  Brendamour ..................... 33/169 C
4,337,579  7/1982  De Fazio .......................... 33/169 C
4,379,363  4/1983  Whitney ........................... 33/169 C Primary Examiner—William D. Martin, Jr.
Attorney, Agent, or Firm—Joseph S. Iandiorio

[57] ABSTRACT

An adjustable RCC device having an adjustable remote center of compliance including: a support member; an operator member interconnected with the support member; a mounting member spaced from the support member; a plurality of radial members extending between and attached to the support member and the mounting member and having a focus at, near or beyond the free end of the operator member; and either means for adjusting radial member geometry or means for adjusting radial member stiffness or means for adjusting stiffness of a deformable portion of the support member or operator member or any combination thereof.

38 Claims, 9 Drawing Figures

ADJUSTABLE REMOTE CENTER COMPLIANCE DEVICE

FIELD OF INVENTION

This invention relates to an adjustable remote center compliance (RCC) device, and more particularly to such a device whose remote center of compliance may be adjusted by varying the stiffness of geometry of various parts of the device.

BACKGROUND OF THE INVENTION

Conventional remote center compliance (RCC) devices are designed with fixed centers of motion and fixed lateral and angular stiffness. RCC devices may be constructed so that their remote centers depend on the geometry of radial members, or on the geometry and stiffness of the radial members and the stiffness of a deformable support member or on the geometry and stiffness of the radial members and the operator member at least a portion of which is deformable, and in various combinations. Frequently, the RCC device is called upon to do a number of different tasks and may require different tools and tool holders as or on its operator member. Since it is desirable to have the remote center of compliance at, near or beyond the tip of the part that is to be engaged or the tip of the tool that is held by the tool holder, a change in tool holder or operator member may require a shift in the location of the remote center of compliance. Presently, this is accomplished by either removing the RCC device currently in use and replacing it with one that has the proper location of remote center of compliance, or rebuilding the RCC device so that its fixed parameters are changed to produce the desired performance. The latter case requires that the RCC device be put out of service for a period of time necessary to reconstruct it. The former requires an inventory of a number of RCC devices whose performance ranges cover the demands of the particular application.

SUMMARY OF THE INVENTION

It is therefore an object of this invention to provide an improved, adjustable remote center compliance device, the location of whose remote center of compliance may be easily and quickly adjusted.

It is a further object of this invention to provide an improved, adjustable remote center compliance device whose lateral stiffness and/or angular stiffness can be easily and quickly adjusted.

The invention results from the realization that the location of the remote center of compliance of an RCC device is determined by the geometry of its radial members; or, (where there are deformable portions), by the stiffness and geometry of the radial members and by the stiffness and geometry of the other deformable portions.

This invention features an adjustable RCC device having and adjustable remote center of compliance. The device includes a support member, an operator member connected with the support member, and a mounting member spaced from the support member. A plurality of radial members extend between and are attached to the support member and the mounting member and have a focus at, near or beyond the free end of the operator member. There are means for adjusting the RCC to shift the focus of the radial members. Means for adjusting may adjust the stiffness of the radial members or the support or operator means or may adjust the geometry of the radial members or even the support or operator means or some combination of these.

In a preferred embodiment, the means for adjusting may include means for shifting at least one end portion of the radial members toward and away from the operator member, or means for moving an intermediate portion of the radial members toward and away from the operator member. The means for moving may also include means for gripping the radial members and fixing them relative to either the mounting member or support member, whereby the stiffness of the radial members may be modified. The focus may be coincident with the remote center of compliance of the RCC device. Alternatively, the support member may include a deformable portion and there may be means for varying the stiffness of that deformable portion to shift the remote center of compliance of the RCC device as well as vary the stiffness of the RCC device.

The invention also features an adjustable RCC device having an adjustable remote center of compliance and including a support member, an operator member interconnected with the support member, and a mounting member spaced from the support member, with the plurality of radial members extending between and attached to the support member at one end and the mounting member at the other end and having a focus at, near or beyond the free end of the operator member, with the additional provision that there are means for varying the stiffness of the radial members. That means for varying the stiffness may include means for gripping the radial members and fixing them relative to either the mounting member or the support member. The focus may be coincident with the remote center of compliance of the RCC device, or the support member may include a deformable portion and there may be means for varying the stiffness of the deformable portion to shift the remote center of compliance of the RCC device.

The invention also features an adjustable RCC device having an adjustable remote center of compliance. Here the support member has a deformable portion with a first center of motion. There is also included an operator member interconnected with the support member and a mounting member spaced from the support member. The radial members extend between and are attached to the support member at one end and the mounting member at the other end, and have a focus at a second center of motion at, near or beyond the free end of the operator member. The remote center of compliance is disposed between the first and second centers. There is provided means for varying the stiffness of the deformable portion.

DISCLOSURE OF PREFERRED EMBODIMENT

Other objects, features and advantages will occur from the following description of a preferred embodiment and the accompanying drawings, in which.

Remote center compliance (RCC) devices establish a center of compliance that is a point in space about which rotational motion and with respect to which translational motion may take place. The remote center may be within the RCC itself or its operator member, or parts held by the operator member, or external to it. A first type of RCC is disclosed in U.S. Pat. No. 4,098,001, Remote Center Compliance System, Paul C. Watson, July 4, 1978. A second type of RCC is disclosed in U. S. Pat. No. 4,155,169, Compliant Assembly System Device, Drake et al, May 22, 1979. A third type of RCC is disclosed in U.S. Patent application Ser. No. 140,768, filed Apr. 16, 1980, Deformable Remote Center Compliance Device, Thomas L. De Fazio. All three disclosures are incorporated here by reference. In the first type of RCC the location of the remote center is determined by the geometry of a plurality of radially disposed members whose focus is a point in space at which the remote center of compliance is located. In the other types of RCC devices, the location of the remote center is determined by the geometry and stiffness of the radial members as well as by the mechanical stiffness of other deformable elements, which may include the support or operator.

The adjustable RCC device according to this invention may use any one of the above mentioned types of RCC devices. Basically, the invention includes a support member, an operator member interconnected with the support member, a mounting member, and a plurality of radial members interconnected between the support member and the mounting member. The invention is accomplished with some means for varying, individually or in combination, the stiffness of the radial elements or the geometry of the radial elements, thereby controlling the location of the remote compliance center. The adjustment of the geometry and/or stiffness of the radial elements may be done independently or in combination and applied to both the first and second types of RCC device.

According to the invention, adjustment means is also provided for the other types of RCC devices by adjusting the stiffness of the deformable portion of its support members, thereby controlling the position of the second center defined by that deformable portion and thus the location of the remote compliance center which is somewhere between that center and the center established by the geometry of the radial members.

Figure 1:
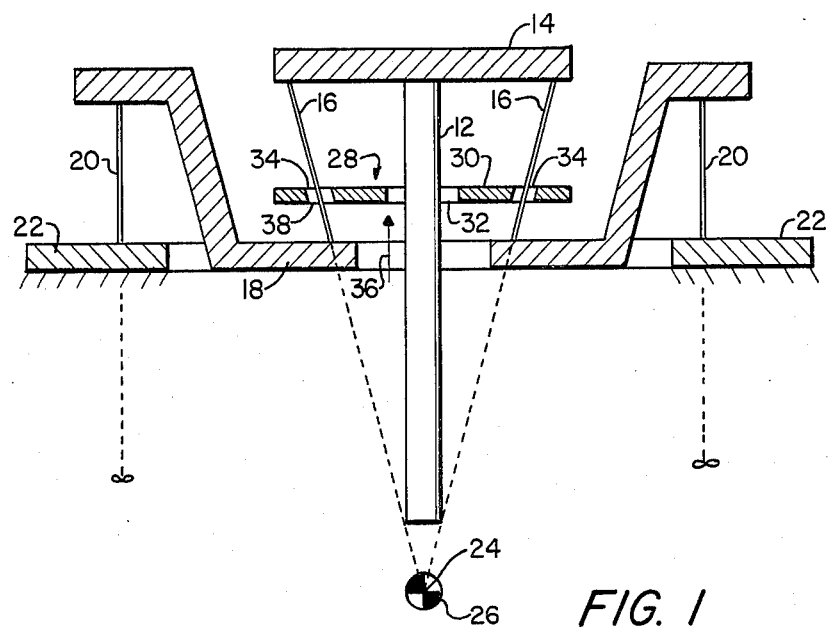
FIG. 1 is a schematic view of an RCC device of the first type referred to herein, having adjusting means according to this invention for modifying geometry and/or stiffness of the radial members.
Figure 2:
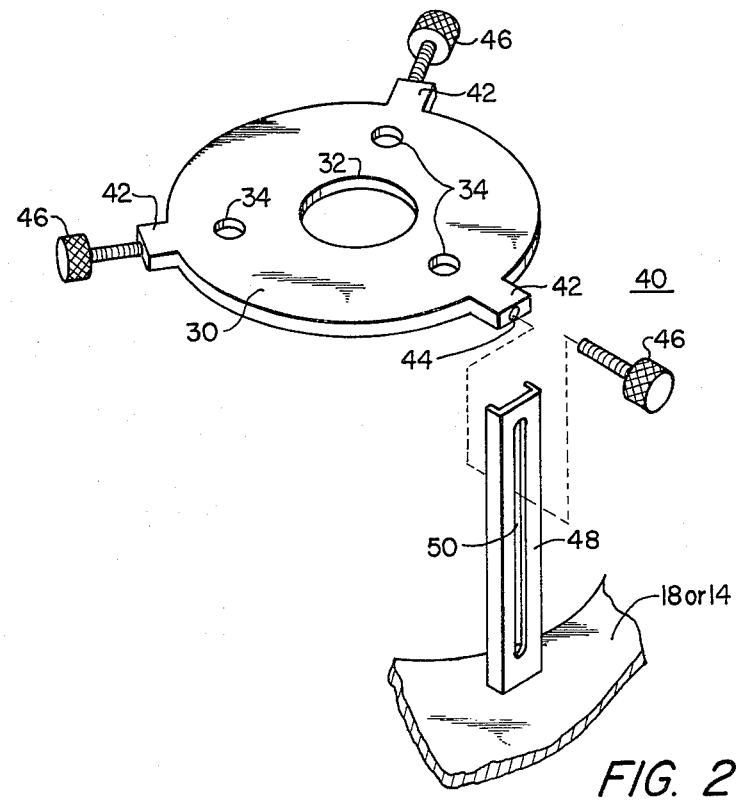
FIG. 2 is an exploded axonometric view illustrating means for guiding and for fixing in place adjusting means according to this invention.

There is shown in FIG. 1 an RCC device of the first type 10 having an operator member 12 carried by support member 14, interconnected by means of three radial members 16 to a mounting member 18, which in turn is connected through three parallel members 20 to frame 22. Three radial members 16, only two of which are visible, emanate from a focus at 24. Parallel members 20 have no focus except at infinity, and remote center 26 coincides with focus 24. Adjusting means 28 includes a plate 30 having a large central hole 32 to accommodate operator member 12 and three circumferentially spaced holes 34 for receiving members 16. As plate 30 is moved upward in the direction of arrow 36, the outer edges 38 of holes 34 begin to bear on radial members 16 and change their direction, thereby shifting the position of focus 24 and remote center of compliance 26. When holes 34 are made small enough with respect to radial members 16, a binding or gripping is effected which will also stiffen the wire and change the characteristics of the RCC 10. Typically some guide means 40, FIG. 2, are provided to enable plate 30 to be moved smoothly and fixed in the desired position.

Guide means 40 includes, for example, extensions 42, each of which includes a threaded hole 44 for receiving thread shafts of thumb screws 46. Extensions 42 ride inside of vertical U-shaped guide 48, only one of which is shown, in FIG. 2, where thumb screw 46 is permitted to ride vertically up and down in slot 50. When plate 30 is in the proper location, thumb screws 46 may be tightened to fix plate 30 in that position. Guide means 48 may be fixed either to mounting means 18 or to support means 14, or to any other part with respect to which the stiffness of radial member 16 is to be controlled.

Figure 3:
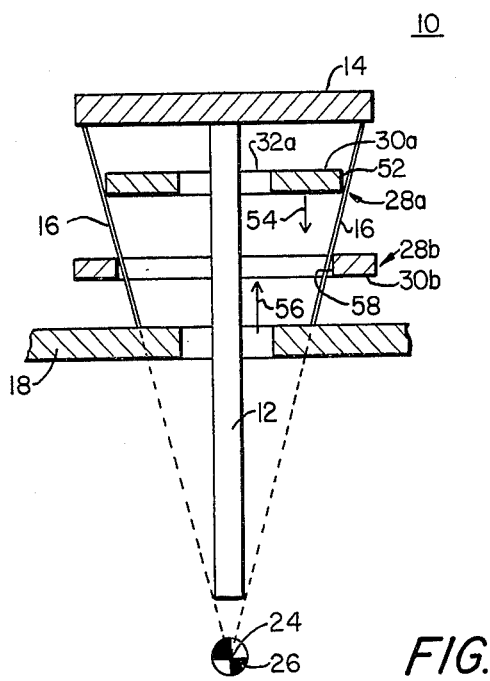
FIG. 3 is a view similar to FIG. 1 of an RCC device of the second type with portions removed showing two alternative adjusting means according to this invention.

Alternatively, radial members 16 may have their stiffness, that is length, and/or geometry, modified by alternative adjusting means 28a, 28b, FIG. 3. In FIG. 3 and throughout the remainder of the specification, like parts have been given like numbers and similar parts like numbers accompanied by successive lower case letters. Adjusting means 28a includes plate 30a disposed within radial members 16 having bearing surface 52 which pushes radial members outwardly as plate 30a is moved down in the direction of arrow 54. In contrast, adjusting means 28b includes plate 30b which surrounds radial members 16 so that when plate 30b is moved upwardly in the direction of arrow 56, surface 58 will push radial member 16 inwardly. In this way the geometry of radial member 16 can be varied to shift the position of focus 24 and remote center of compliance 26. Guide means may be provided for adjusting means 28a and 28b, and adjusting means 28a and 28b may be used together to provide a gripping action on radial members 16.

Figure 4:
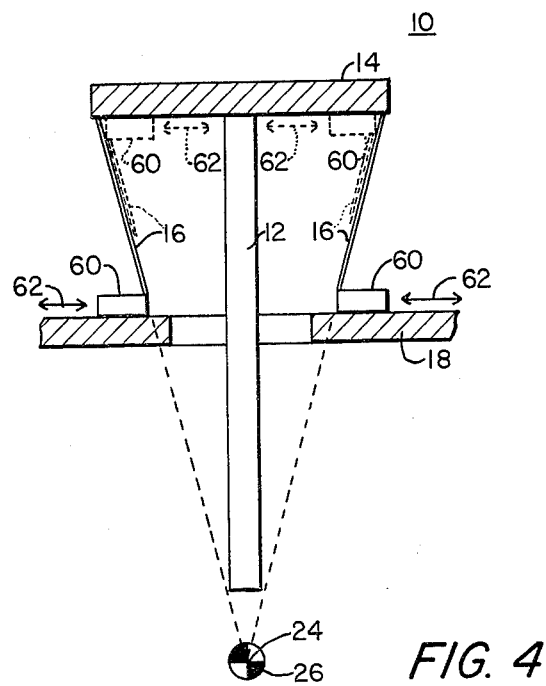
FIG. 4 is a view similar to FIG. 1 of an RCC device of the second type with parts removed, illustrating yet another form of adjusting means according to this invention for modifying the geometry of the radial members.

An alternative technique for shifting the geometry of radial members 16 employs slide blocks 60, FIG. 4, which move laterally in the direction of arrows 62 in a manner similar to scrolls on a lathe chuck. Slide block 60 may also be placed at the upper end of radial members 16, as indicated in phantom, or both the upper and lower ends.

All of the examples illustrated with respect to FIGS. 1-4 are applicable to vary the stiffness and/or geometry of the radial members of any of the three types of RCC devices.

Figure 5:
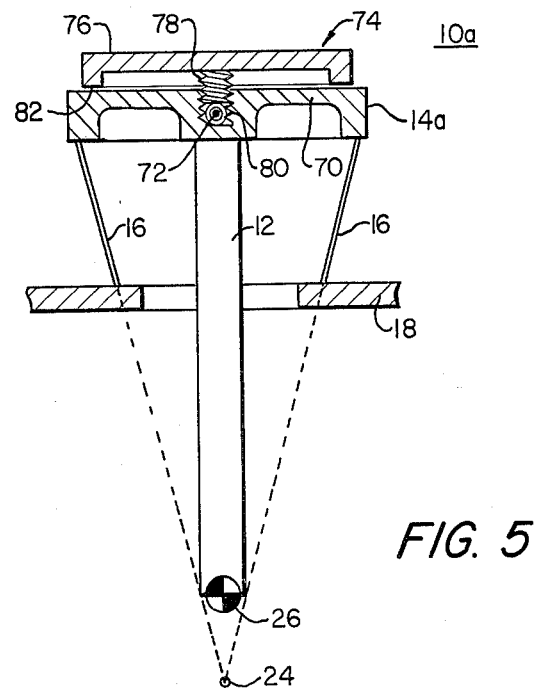
FIG. 5 is a schematic view of an RCC device of the second type referred to herein showing adjusting means for varying the stiffness of a deformable portion thereof.

The second type of RCC device 10a, FIG. 5, includes in its support member 14a a deformable portion 70 which establishes a second center of motion 72 at the upper end of operator member 12. The remote center of compliance 26 is thus located somewhere between focus or center 24 established by the geometry of radial members 16, and the center 72 established by deformable portion 70. A shift in position of center 72 or center 24, or a change in compliance about either center, results in a change of position of remote center of compliance 26. The compliance about center 72 is changed by changing the stiffness of deformable portion 70. In FIG. 5 this is effected by adjusting means 74, which includes a plate 76 having a central threaded stud 78 that engages with threaded hole 80 in the top of support member 14a. As the adjusting means is rotated clockwise and threads 78 penetrate more deeply into threaded hole 80, bearing surface 82 engages and firmly contacts support member 14a. With adjusting means 74 tightened down so that no interruption of contact occurs during operation, the effective stiffness of deformable portion 70 is increased, thus moving remote center of compliance 26.

Figure 6:
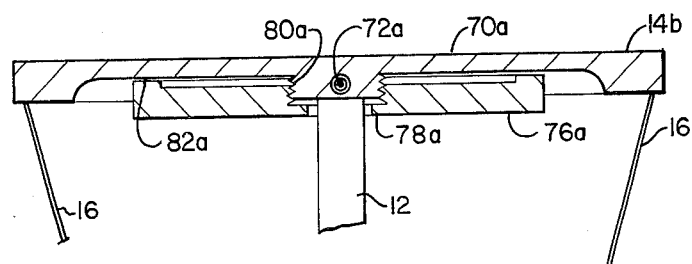
FIG. 6 is a view similar to FIG. 5 with portions removed showing another means for adjusting the same deformable portion.

Alternatively, plate 76a, FIG. 6, may be provided with internal threads 78a that engage with external threads 80a on support member 14 or at the top of operator member 12. As plate 76 is screwed on tighter, bearing surface 82a of plate 76a tightly contacts deformable portion 70a and thereby increases the stiffness of deformable portion 70a and changes the center of compliance about center 72a, resulting in a shift of the remote center of compliance.

Figure 7:
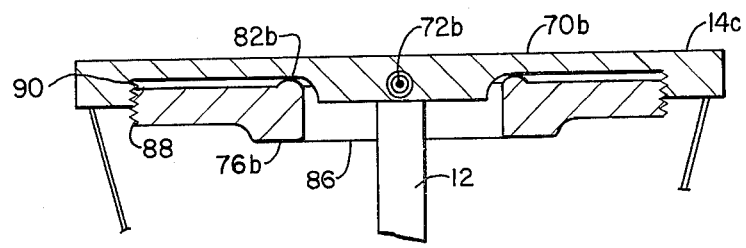
FIG. 7 is a view similar to FIG. 6 showing yet another means for adjusting the same deformable portion.
Figure 8:
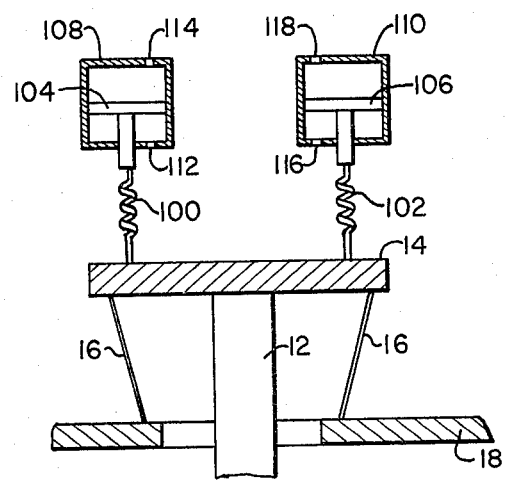
FIG. 8 is a schematic view showing an alternative approach to increasing the stiffness of the radial members.

Alternatively, plate 76b, FIG. 7, may be provided with a clearance hole 86 and external circumferential threads 88 which engage similar internal threads 90 on the outer edge of support member 14c. As plate 76b is screwed down tight it contacts deformable portion 70b at some circumferential line or area such as bearing surface 82b, and increases the stiffness of deformable portion 70b.

The stiffness of the RCC may also be controlled by the application of external force, for example through springs 100, 102 attached to pistons 104, 106 driven in cylinders 108, 110 by the application of pressure at ports 112 and 116 or 114 and 118, respectively.

Figure 9:
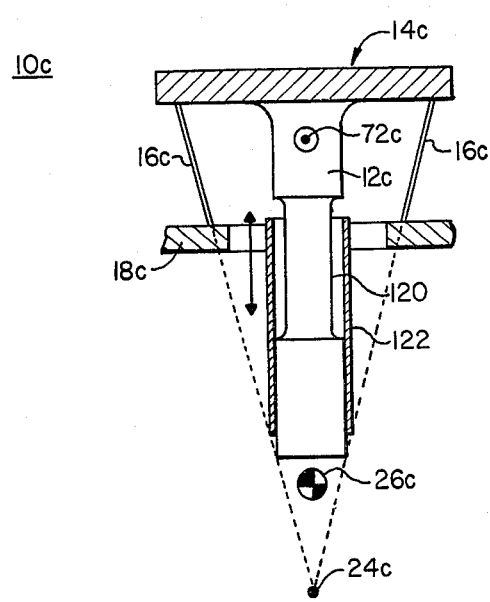
FIG. 9 is a schematic view of an RCC device of the third type referred to herein showing adjusting means for adjusting a deformable portion of the operator means.

The third type of RCC device 10c, FIG. 9, includes a support member 14c, radial members 16c and an operator member 12c at least a portion of which is deformable such as portion 120. Support member 14c is relatively stiff compared to deformable operator member 12c. Tube 122 is provided slidable on operator member 12c to adjust the stiffness thereof. As tube 122 is slid upwardly in FIG. 9 it grips the upper as well as the lower, larger diameter portions of operator member 12c on either side of narrower portion 120 and increases stiffness of operator member 12c.

Other embodiments will occur to those skilled in the art and are within the following claims:

What is claimed is:

1. An adjustable RCC device having an adjustable remote center of compliance comprising:
   a support member;
   an operator member interconnected with said support member;
   a mounting member spaced from said support member;
   a plurality of radial members extending between and attached to said support member and said mounting member and having a focus at, near or beyond the free end of said operator member; and
   means for moving at least a portion of said radial members toward and away from said operator member to shift the focus of said radial members.

2. The adjustable RCC device of claim 1 in which said means for moving includes means for shifting at least one end portion of said radial members toward and away from said operator member.

3. The adjustable RCC device of claim 1 in which said means for moving includes means for moving an intermediate portion of said radial members toward and away from said operator member.

4. The adjustable RCC device of claim 3 in which said means for moving includes means for gripping said radial members and fixing them relative to one of said mounting member and support member.

5. The adjustable RCC device of claim 1 in which said focus is coincident with the remote center of compliance of said RCC device.

6. The adjustable RCC device of claim 1 in which said support member includes a deformable portion.

7. The adjustable RCC device of claim 6 further including means for varying the stiffness of said deformable portion to shift the remote center of compliance of said RCC device.

8. An adjustable RCC device having an adjustable remote center of compliance comprising:
   a support member;
   an operator member interconnected with said support member;
   a mounting member spaced from said support member;
   a plurality of radial members extending between and attached to said support member and said mounting member and having a focus at, near or beyond the free end of said operator member; and
   means for varying the stiffness of said radial members to shift the remote center of compliance;
   said means for varying including a bearing element disposed about and being movable axially relative to said operator member to bear on said radial members.

9. The adjustable RCC device of claim 8 in which said means for varying the stiffness includes means for gripping said radial members and fixing them relative to one of said mounting member and support member.

10. The adjustable RCC device of claim 8 in which said focus is coincident with the remote center of compliance of said RCC device.

11. The adjustable RCC device of claim 8 in which said support member includes a deformable portion.

12. The adjustable RCC device of claim 11 further including means for varying the stiffness of said deformable portion to shift the remote center of compliance of said RCC device.

13. An adjustable RCC device having an adjustable remote center of compliance comprising:
   a support member having a deformable portion with a first center of motion;
   an operator member interconnected with said support member;
   a mounting member spaced from said support member;
   a plurality of radial members extending between and attached to said support member and said mounting member and having a focus at a second center of motion at, near or beyond the free end of said operator member and said remote center of compliance is disposed between said first and second centers; and means for varying the stiffness of said deformable portion to shift said first center and said remote center of compliance.

14. The adjustable RCC device of claim 13 in which said means for varying includes an auxiliary member and means for tightly clamping said auxiliary member to said deformable portion.

15. The adjustable RCC device of claim 14 in which said auxiliary member includes a plate with means for engaging said deformable portion and thread means for engaging with thread means on said support member.

16. The adjustable RCC device of claim 13 further including means for adjusting at least a portion of said radial members toward and away from said operator member to shift the focus of said radial members.

17. The adjustable RCC device of claim 16 in which said means for adjusting includes means for shifting at least the end portion of said radial members toward and away from said opperator member.

18. The adjustable RCC device of claim 16 in which said means for adjusting includes means for moving an intermediate portion of said radial members toward and away from said operator member.

19. The adjustable RCC device of claim 18 in which said means for moving an intermediate portion of said radial members toward and away from said operator member includes means for gripping said radial members and fixing them relative to said mounting member.

20. An adjustable RCC device having an adjustable remote center of compliance comprising:
   a support member;
   an operator member interconnected with said support member, at least a portion of said operator member being deformable;
   a mounting member spaced from said support member;
   a plurality of radial members extending between and attached to said support member and said mounting member and having a focus at, near or beyond the free end of said operator member; and
   means for adjusting the stiffness of said deformable portion of said operator member to shift the remote center of compliance.

21. The adjustable RCC device of claim 20 in which said support member includes a deformable portion.

22. The adjustable RCC device of claim 20 further including means for varying the stiffness of said deformable portion to shift the remote center of compliance of said RCC device.

23. The adjustable RCC device of claim 1 in which said means for moving includes a bearing element disposed about and being movable axially relative to said operator member to bear on said radial members when said plate is moved toward said support member.

24. The adjustable RCC device of claim 23 in which said bearing element includes a plate having a central hole for receiving said operator member therethrough and a plurality of circumferentially spaced holes for receiving respective radial members therethrough, the outside edges of said circumferentially spaced holes increasingly bearing on said radial members as said plate is moved toward said support member.

25. The adjustable RCC device of claim 24 further including guide means attached to at least one of said support member and said mounting member for guiding said plate in its axial movement.

26. The adjustable RCC device of claim 25 further including means for releasably fixing said plate in position to said guide means.

27. The adjustable RCC device of claim 1 in which said means for moving includes a first bearing element disposed within said radial members and being movable axially relative to said operator member to increasingly bear on said radial members when said first bearing element is moved toward the free end of said operator member; and a second bearing element disposed outside of said radial members and being movable axially relative to said operator member to increasingly bear on said radial members when said second plate is moved toward said support member.

28. The adjustable RCC device of claim 27 in which said first bearing element includes a first annular plate having a central opening for receiving said operator member therethrough and an outside circumference for bearing on said radial members and said second bearing element includes a second annular plate having a central opening for receiving said operator member and radial members therethrough and an inside circumference for bearing on said radial members.

29. The adjustable RCC device of claim 28 further including guide means attached to at least one of said support members and mounting member for guiding said plates in their axial movement.

30. The adjustable RCC device of claim 29 including means for fixing said plates to said guide means.

31. The adjustable RCC device of claim 1 in which said means for moving includes blocks attached to at least one end of each said radial member for movably engaging a respective one of said support member and said mounting member.

32. The adjustable RCC device of claim 8 in which said bearing element includes a plate having a central hole for receiving said operator member therethrough and a plurality of circumferentially spaced holes for receiving respective radial members therethrough, the outside edges of said circumferentially spaced holes increasingly bearing on said radial members as said plate is moved toward said support member.

33. An adjustable RCC device having an adjustable remote center of compliance comprising:
   a support member;
   an operator member interconnected with said support member;
   a mounting member spaced from said support member;
   a plurality of radial members extending between and attached to said support member and said mounting member and having a focus at, near or beyond the free end of said operator member; and
   means for varying the stiffness of said radial members to shift the remote center of compliance;
   said means for varying including a first bearing element disposed within said radial members and being movable axially relative to said operator member to increasingly bear on said radial members when said first bearing element is moved toward the free end of said operator member; and a second bearing element disposed outside of said radial members and being movable axially relative to said operator member to increasingly bear on said radial members when said second plate is moved toward said support member.

34. The adjustable RCC device of claim 33 in which said first bearing element includes a first annular plate having a central opening for receiving said operator member therethrough and an outside circumference for bearing on said radial members and said second bearing element includes a second annular plate having a central opening for receiving said operator member and radial members therethrough and an inside circumference for bearing on said radial members.

35. The adjustable RCC device of claim 33 in which said means for varying the stiffness includes means for gripping said radial members and fixing them relative to one of said mounting member and support member.

36. The adjustable RCC device of claim 33 in which said focus is coincident with the remote center of compliance of said RCC device.

37. The adjustable RCC device of claim 33 in which said support member includes a deformable portion.

38. The adjustable RCC device of claim 37 further including means for varying the stiffness of said deformable portion to shift the remote center of compliance of said RCC device.

* * * * *